United States Patent

[11] 3,591,164

| [72] | Inventor | Glen M. Jamieson |
| | | Blair Athol, South Australia, Australia |
| [21] | Appl. No. | 725,042 |
| [22] | Filed | Apr. 29, 1968 |
| [45] | Patented | July 6, 1971 |
| [73] | Assignee | The Commonwealth of Australia |
| | | Parkes, Australia |
| [32] | Priority | May 1, 1967 |
| [33] | | Australia |
| [31] | | 21084/67 |

[54] HIGH-HYSTERESIS SHOCK ABSORBER
6 Claims, 5 Drawing Figs.

[52] U.S. Cl. .................................................. 267/140
[51] Int. Cl. .................................................. F16f 1/44
[50] Field of Search ....................................... 267/140,
116, 121, 35, 8, 64, 128

[56] References Cited
UNITED STATES PATENTS

| 2,981,534 | 4/1961 | Peras .......................... | 267/35 |
| 2,602,181 | 7/1952 | Knipe .......................... | 267/1 (28) |

FOREIGN PATENTS

| 650,195 | 9/1937 | Germany ...................... | 267/35 |

*Primary Examiner*—James B. Marbert
*Attorney*—Waters, Roditi & Schwartz

ABSTRACT: A shock absorber comprising an elastomeric tube disposed over a movable member in such a manner that frictional engagement of the elastomeric tube with the member on which it is disposed, together with inherent resistance of the elastomeric tube results in a damping action on the movable member.

HIGH-HYSTERESIS SHOCK ABSORBER

This invention relates to a high-hysteresis shock absorber which is of simple construction and of light weight and is capable of absorbing a large input of kinetic energy with a resisting force which is substantially constant over a wide range of deflections and rates of energy input.

An object of the invention is to provide a simple and effective shock absorber which can be used, for instance, for landing devices for air-dropped equipment and sounding-rocket payloads, automotive bumper mountings, and steering columns, undercarriages for utility helicopters, railway carriage buffers and the like where the low recoil velocity would damp out longitudinal oscillations, and shock-absorbing mounts for transporting fragile equipment.

The above and other objects are achieved according to this invention by a shock absorber which comprises an elastomeric tube between the ends of which the load is applied, the tube being disposed on a rigid member in such a manner that compression of the elastomeric tube causes frictional engagement of the tube with the rigid member to give, with the inherent resistance to deformation, the required resistive force.

The recoil energy returned by a shock absorber according to this invention, while resetting, is generally less than 1 percent of the energy absorbed, while performance characteristics are similar to those of a hydraulic shock absorber combined with a light return spring, but the weight, cost and bulk are far less and such a shock absorber will operate in any orientation.

Basically in its simplest form the device comprises a plasticized P.V.C. or similar elastomeric tube constrained by ferrules at each end and guided by a rigid tube. The P.V.C. tube is initially formed with shallow circumferential corrugations of a pitch approximately equal to the mean diameter of the tube.

When compressed, the corrugations deflect so that their internal diameter presses against the outside of the guide tube as it slides through them. Part of the applied energy is dissipated in deforming the plastic tube, and part in friction. The low rate of recovery of the deformed elastomeric tube results in a low recoil velocity.

For maximum life, the rubbing surfaces should be lubricated, and the guide tube should be polished, but for a "one-shot" device, where maximum energy absorption is required, the guide tube should be dry and rough. The corrugations of the elastomeric tube may be separate or formed in a continuous spiral. The spirally corrugated tube has smooth compression and recoil characteristics, but the separately corrugated tube has a greater ratio of compression force to recoil force. By decreasing the initial clearance between the outside of the guide tube and the internal diameters of the corrugations, the force required for compression will be increased and the recoil force will be decreased. If desired the recoil force may be negative, that is, the shock absorber would become double acting.

To enable the invention to be fully appreciated, an embodiment thereof will now be described with reference to the accompanying drawings but it is to be clear that the invention is not to be limited to the form illustrated, the scope being defined in the claims herein.

Figure 1:
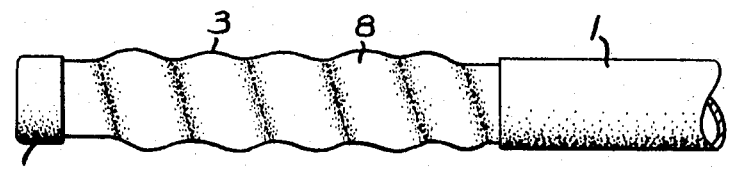
FIG. 1 is an elevation view of the shock absorber.
Figure 2:
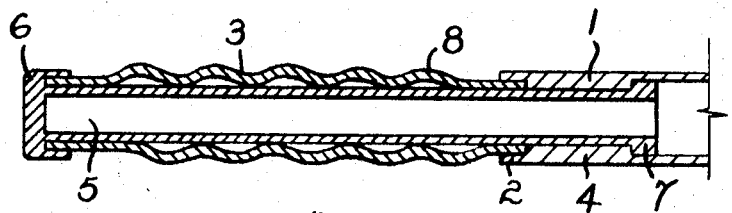
FIG. 2 is a longitudinal section of same.

According to the form illustrated, the shock absorber comprises an outer tube 1 which forms a reaction or support member and which has at its end a ferrule 2 to receive one end of the corrugated elastomeric tube 3, this outer tube 1 having a bearing 4 within it which slidably engages a rigid member in the form of an inner tube 5 which has a ferrule 6 at its outer end which engages the other end of the corrugated elastomeric tube. Outward movement of the inner tube within the outer tube is limited by a collar 7 at the inner end of the inner tube which contacts the inner end of the bearing 4 to limit outward movement of the inner tube 5.

The elastomeric tube 3 has along its length a helical corrugation 8, and fits neatly on to the tube 5, the ends of the elastomeric tube being attached permanently to the ferrules 2 and 6 in any suitable manner such as by use of an adhesive, or left unjoined.

The corrugations can be other than helical, such as circumferential, or they may be replaced by discontinuous members which allow a similar action.

In its uncompressed state, the inner tube 5 projects from the outer tube 1 by an amount permitted by the limited stop 7 between the tubes, but the projecting part of the inner tube is covered by the corrugated elastomeric tube 3 so that a completely sealed unit results in which the elastomeric tube 3 is coextensive with the outer tube 1.

Figure 3:
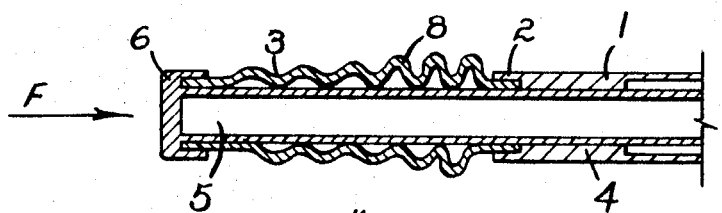
FIGS. 3, 4 and 5 are similar views to FIG. 2 but showing in FIG. 3 a partial compression of the tube, in FIG. 4 a full compression and in FIG. 5 a partial recovery.
Figure 4:
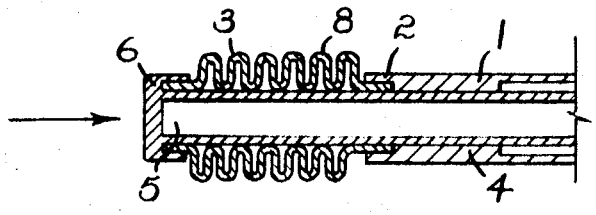

During an application of an input force as shown in FIG. 3, the corrugated elastomeric tube 3 compresses first at the further end in relation to the applied force, designated F, and provided the force is maintained, such compression continues until the tube is compressed to its shortest allowable form, as shown in FIG. 4. The action of compressing the corrugations 8 results in the applied energy being dissipated, partly in deforming the elastomeric tube 3 and partly in the friction created by contact between elastomeric tube 3 and the outside of the inner rigid tube 5.

Figure 5:
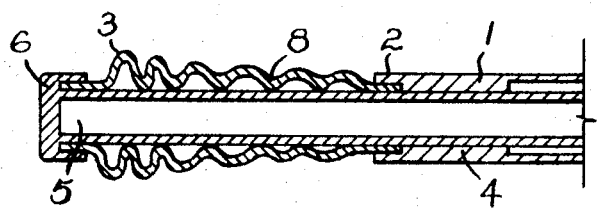

During recovery, the tube 3 will regain its normal corrugated shape first at the inner end and gradually extending to the outer end where the force was originally applied as shown in FIG. 5.

What I claim is:

1. A shock absorber comprising an elastomeric tube having opposite ends and adapted to receive the application of axial force in a direction to compress the tube, a rigid member on which said elastomeric tube is disposed and frictionally engaged, means fixed on the rigid number and secured to one end of the elastomeric tube, a reaction member engaging said rigid member to allow relative axial movement between said members and means fixed on said reaction member and secured to the other end of the said elastomeric tube, said elastomeric tube having substantially circumferential corrugations and being so dimensioned with respect to the said rigid member such that at rest the corrugations of the tube are initially in frictional engagement with the rigid member to resist displacement of the rigid member under the action of the applied compression force both by said frictional engagement and by deformation of the elastomeric tube.

2. A shock absorber according to claim 1 wherein the rigid member projects outwards from the reaction member, the latter being tubular and including a bearing therein in which the rigid member slides, said means to which the ends of the elastomeric tube are secured comprising ferrules on said reaction member and on said rigid member, said elastomeric tube surrounding the projecting portion of the rigid member in frictional engagement and being coextensive with the reaction member.

3. A shock absorber according to claim 2 wherein the substantially circumferential corrugations of the elastomeric tube have a pitch approximately equal to the mean diameter of the tube.

4. A shock absorber according to claim 1 wherein said tube has a uniform thickness between said ends.

5. A shock absorber according to claim 2 wherein the elastomeric tube is corrugated between said ferrules.

6. A shock absorber according to claim 2 wherein the elastomeric tube is plasticized polyvinylchloride.